May 12, 1953  G. L. CORY  2,637,876
METHOD OF PREVENTING THE OCCURRENCE OF PIN HOLES
IN THIN, MICROPOROUS HARD RUBBER SEPARATORS
Filed April 14, 1951
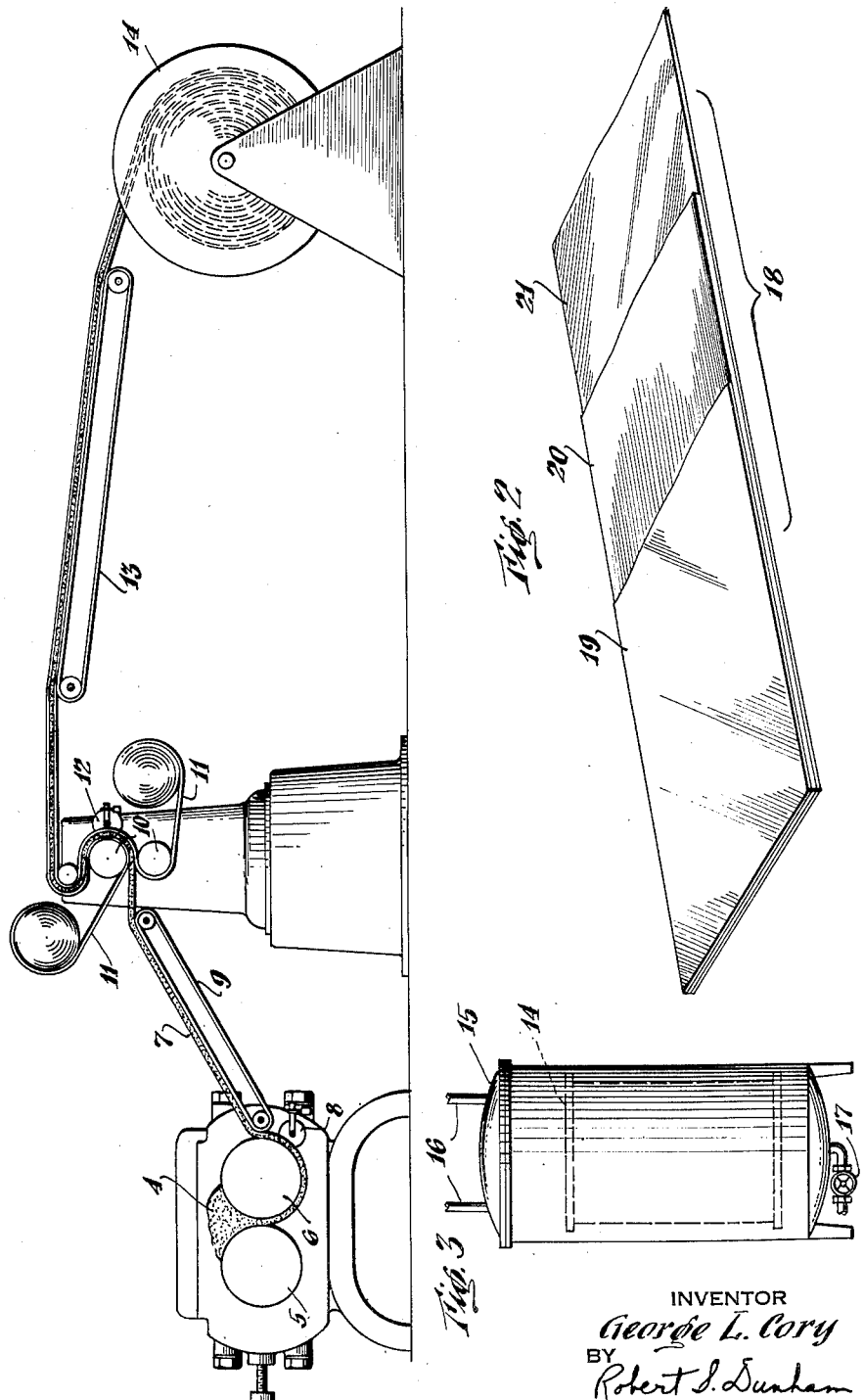
INVENTOR
George L. Cory
BY
Robert S. Dunham
ATTORNEY Patented May 12, 1953

2,637,876

UNITED STATES PATENT OFFICE 2,637,876

METHOD OF PREVENTING THE OCCURRENCE OF PIN HOLES IN THIN, MICROPOROUS HARD RUBBER SEPARATORS

George L. Cory, Erskine Lakes, N. J., assignor to American Hard Rubber Company, New York, N. Y., a corporation of New York Application April 14, 1951, Serial No. 221,027

6 Claims. (Cl. 18—53)

1

The present invention relates to a method of preventing the occurrence of pin holes in thin, microporous hard rubber separators, and more particularly for preventing the occurrence or formation of such pin holes as might permit the circulation of electrolyte through such a separator in an electrolytic cell, in instances where the separator has a thickness of only about .007 to about .02 inch.

The making of microporous separators of medium and of relatively heavy thicknesses has been carried on for some time in accordance with the teachings of the Schelhammer et al. Patent No. 2,274,260, granted February 24, 1942. In accordance with this patent, a rubber composition, including some moist silica gel, was first formed by a usual rolling process, common in the rubber fabrication industry, into strips or sheets. In order that the strips or sheets thus formed should not curl up, shrink or be deformed during subsequent vulcanization, it was the practice as taught in that patent to place a sheet of a substantially unstretchable material on one side of the sheet of rubber and adhering thereto. This strip of unstretchable material, which in practice could be kraft paper, served admirably to prevent undesired stretching of the rubber and other deformations incident to the wet vulcanization and also during the drying of the sheet or strip following the vulcanization. It was found, however, that when microporous separators of this general type were made very thin, such as are now being called for in high capacity, low weight storage batteries for use in aircraft, fine pin holes were somehow formed in the rubber sheet. These pin holes were almost invisible to the naked eye when the sheet was inspected in the ordinary way, but could be seen when looking through the sheet toward a strong light. Notwithstanding the small size of these pin holes, they caused substantial difficulty in practice, in that they permitted on actual interchange or flow of electrolyte from one side of such a sheet to the other. This was a ground for rejection of sheets of this kind for use in storage batteries. Prior to the present invention, the percentage of rejects due to this cause was from 50% up to 97%. Whenever the sheets were more than about .02 inch in thickness, the pin holes were not formed to the extent of causing rejection of any substantial number of sheets. Further, if only a few pin holes were present in a sheet, not more than 10 in a sheet of about 6 by 6 inches, it is economically feasible to repair the pin holes by placing

2 over each of them a small dot of cement. If more than this number of pin holes are present in a sheet, the work of repairing them is economically out of proportion to the value of the sheet. A principal purpose, therefore, of the present invention is to minimize, and in most instances to eliminate altogether, the presence or occurrence of pin holes in very thin separator sheets of this kind.

The reason why pin holes are formed in these very thin sheets is not definitely known. The present invention, however, results in reducing or eliminating them to an extent such that substantially all the sheets will be acceptable as set forth in detail hereinafter.

Summarizing the present invention, it comprises assembling together a sheet or strip of uncured permeable hard rubber composition of a desired size and either in the form of a sheet or a strip, this hard rubber composition being assembled with two similarly shaped sheets or strips of a suitable unstretchable material, such as was contemplated for use in the Schelhammer et al. patent aforesaid, the assembly being effected in such manner that one of said two sheets or strips is arranged on each side of the hard rubber sheet or strip, so as to cover the entire area intended for use as microporous battery separators. In this way, a composite sheet or strip is formed. This composite sheet or strip is then compacted, so as to secure intimate adhering contact between the uncured hard rubber composition sheet or strip and the unstretchable material on each side thereof. The composite sheet or strip after having been thus compacted, is then vulcanized by wet vulcanizing and dried in a conventional manner as set forth in greater detail in the Schelhammer et al. patent aforesaid. Following the drying, the unstretchable material, which is kraft paper in a preferred form of the invention, is easily removed from the cured hard rubber separator sheet or strip, which may then be trimmed or cut to the desired shape and size for its ultimate use.

Further and more detailed advantages and features of the present invention will be apparent from the following detailed description and will be pointed out in the appended claims, all when considered in connection with the accompanying drawings, in which:

Figure 1 is a view substantially in side elevation of an apparatus for making the composite strip;

Fig. 2 is a fragmentary perspective view illustrating a composite strip broken away to show the layers; and Fig. 3 illustrates a vulcanizing tank where a roll of composite strip may be cured.

The uncured hard rubber composition for forming the separator sheets is prepared and mixed in the usual way and the mixture may be any satisfactory mixture which has been used, such as that set forth in the aforementioned patent to Schelhammer et al. The mixture, after having been prepared, is placed at 4 between rolls 5 and 6 of a warming mill. The hard rubber composition material is then rolled out into a strip 7 and may be trimmed to preliminary size by one or more cutters 8. There will usually be two of these cutters, one for each edge of the strip. This strip is then carried by a conveyor belt 9 to calender rolls 10 where the thickness is determined. In accordance with the present invention, this thickness may be from about .007 inch to about .02 inch, a preferred thickness in this range being about .015 inch. At the calender rolls 10, two strips of unstretchable material 11 are introduced, one on each side of the hard rubber composition strip 7. These strips of unstretchable material may be paper, fine mesh wire or cloth. However, since the vulcanizing is damaging to cloth or paper, and since the cost of wire mesh is usually prohibitive, it has been found that use of kraft paper serves best and can be discarded after use. The cost of this paper, even when used but once, is reasonable as a part of the cost of making the final desired article. The strip 7 as it reaches the calender rolls is somewhat thicker than the final desired thickness of the separators being made, so that good intimate and adhering contact will be effected between the rubber composition and the paper on each side. This forms a composite strip made up of two layers of paper and a layer of uncured hard rubber composition in between. The strip may be, if desired, trimmed again to a final width at the upper calender roll by cutters 12, one of which is shown. The composite strip made up of the three layers is now conveyed by a conveyor 13 to a drum or reel 14 where the composite strip is rolled up. When the drum is filled, it may be removed and placed in a vulcanizing tank such as shown in Fig. 3. After being placed in the tank, the lid 15 thereof is securely fastened and steam or hot water is introduced through pipes 16 to cure or vulcanize the roll of composite strip. When the vulcanizing is complete, the solution may be drained off from the bottom of the tank through a pipe controlled by a valve 17 as shown; after which the roll will be removed and the composite strip dried in a suitable manner as is usual in the art.

Fig. 2 illustrates a composite strip generally indicated at 18, which is made up of layers 19, 20 and 21. The outer layers 19 and 21 are preferably strips of kraft paper, while the center layer 20 is of a desired hard rubber composition.

When this process is completed and the finished strip is dried, the kraft paper layers may be easily removed or stripped off the hard rubber composition.

Results of samples taken in using the previous method and the method of this invention show that the number of finished separators which must be rejected is reduced to a minimum by the present method using double layers of paper. The table below shows a comparison between the prior art and the present method.

TABLE I

*Inspection results*

| No. of Pinholes per Separator | Old Method of Production Using a Single Layer of Paper | | Double Paper Method | |
|---|---|---|---|---|
| | No. of Seps. | Percent Seps. | No. of Seps. | Percent Seps. |
| Good separators (no defects) | 15,600 | 31.5 | 1,046 | 71.8 |
| 1 \ | 11,900 | 24.0 | 332 | 22.8 |
| 2 | 5,690 | 11.5 | 59 | 4.0 |
| 3 | 2,890 | 5.8 | 16 | 1.16 |
| 4 | 1,495 | 3.0 | 2 | .12 |
| 5 } Repairable | 735 | 1.5 | 0 | 0.0 |
| 6 | 379 | .8 | 0 | 0.0 |
| 7 | 237 | .5 | 0 | 0.0 |
| 8 | 189 | .4 | 0 | 0.0 |
| 9 | 95 | .2 | 0 | 0.0 |
| 10 / | 95 | .2 | 0 | 0.0 |
| Scrap separators (more than 10 holes, large holes, open surface and foreign mat'l.) | 10,184 | 20.6 | 3 | .12 |
| | | 100.0 | | 100.00 |

TABLE II

*Summary of Table I results*

| | Old Method of Production Using a Single Layer of Paper | | Double Paper Method | |
|---|---|---|---|---|
| | No. of Seps. | Percent Seps. | No. of Seps. | Percent Seps. |
| Good Separators | 15,600 | 31.5 | 1,046 | 71.8 |
| Repairable separators (1 to 10 pinholes, incl.) | 23,700 | 47.9 | 409 | 28.0 |
| Total salable seps. (good and repairable) | 39,300 | 79.4 | 1,455 | 99.8 |
| Holes per 100 salable separators | 125 | | 35 | |
| Scrap separators | 10,184 | 20.6 | 3 | 0.2 |
| | 49,484 | 100 | 1,458 | 100 |

While the method of the present invention has been disclosed in its preferred and present commercial form and certain alternatives and equivalents have been specifically taught, it is recognized that other equivalents will occur to those skilled in the art from the foregoing. I do not wish to be limited, therefore, except by the scope of the appended claims, which are to be construed validly as broadly as the state of the prior art permits.

What is claimed is:

1. The method of preventing occurrence of pin holes in thin microporous strips of hard rubber composition which are adapted for use in electrolytic cells, wherein said strips have a thickness of from about .007 inch to about .02 inch, comprising the steps of preparing a preliminary strip of an uncured permeable hard rubber composition; assembling said preliminary strip with two strips of unstretchable material, in such manner that one of said two strips will be on each side of said preliminary strip and will cover both sides of an area thereof intended to form microporous separators, and thereby forming a composite strip; passing said composite strip through calender rolls so as to bring the strips making up said composite strip into intimate and adhering contact with each other throughout their areas and to control the thickness of the rubber composition strip to a predetermined value in the range of .007 inch to .02 inch; preventing the occurrence of pin holes in the rubber composition strip by wet vulcanizing said composite strip while both strips of said unstretchable material remain in adhering contact with said strip of rubber composition; drying said composite strip; and thereafter removing said strips of unstretchable material from said strip of rubber composition.

2. The method in accordance with claim 1, wherein said unstretchable material is paper.

3. The method in accordance with claim 1, wherein said unstretchable material is kraft type paper.

4. The method of preventing occurrence of pin holes in thin microporous sheets of hard rubber composition which are adapted for use in electrolytic cells, wherein said sheets have a thickness of from about .007 inch to about .02 inch, comprising the steps of preparing a preliminary sheet of an uncured permeable hard rubber composition; applying to each side of said preliminary sheet a sheet of unstretchable material as large in area as determined by the finished usable microporous sheet; pressing said sheets into intimate and adhering contact throughout their area to form a composite sheet and to control the thickness of the sheet of hard rubber composition to a predetermined value in the range of .007 inch to .02 inch; preventing the occurrence of pin holes in the sheet of rubber composition by wet vulcanizing said composite sheet while both sheets of said unstretchable material remain in adhering contact with said sheet of rubber composition; drying said composite sheet; and thereafter removing said sheets of unstretchable material from said sheet of rubber composition.

5. The method in accordance with claim 4, wherein said unstretchable material is paper.

6. The method in accordance with claim 4, wherein said unstretchable material is kraft type paper.

GEORGE L. CORY.

References Cited in the file of this patent

UNITED STATES PATENTS

| Number | Name | Date |
|---|---|---|
| 1,337,802 | Somerville | Apr. 20, 1920 |
| 1,628,979 | Hood | May 17, 1927 |
| 1,943,101 | Wheatley | Jan. 9, 1934 |
| 2,043,954 | Kershaw | June 9, 1936 |
| 2,274,260 | Schelhammer | Feb. 24, 1942 |